United States Patent [19]

Weingarten

[11] 4,147,111

[45] Apr. 3, 1979

[54] LOAD DISTRIBUTIVE CARGO PLATFORM SYSTEM

[76] Inventor: Joseph L. Weingarten, 1927 Oak Tree Dr., E., Dayton, Ohio 45440

[21] Appl. No.: 807,619

[22] Filed: Jun. 17, 1977

[51] Int. Cl.$^2$ .............................................. B60P 7/08
[52] U.S. Cl. .............................. 105/463; 193/35 SS; 244/118 R; 414/529
[58] Field of Search ............... 105/463, 464, 465, 454, 105/375; 214/84, 515; 244/118 R; 193/35 SS

[56] References Cited

U.S. PATENT DOCUMENTS

| | | | |
|---|---|---|---|
| 3,011,665 | 12/1961 | Wise | 193/35 SS X |
| 3,213,993 | 10/1965 | Long | 193/35 SS |
| 3,439,790 | 4/1969 | Langley et al. | 193/35 SS |

Primary Examiner—Albert J. Makay
Attorney, Agent, or Firm—Joseph E. Rusz; James S. Shannon

[57] ABSTRACT

A cargo pallet, pallet support and restraint system which distributes the supporting forces equally over the bottom of the cargo pallet, even though the cargo load forces are concentrated and unevenly distributed over the pallet. The pallet is supported by a system of multiple ball or roller assemblies acting in conjunction with an interconnected hydraulic pallet support system to produce a multiplicity of equal lifting forces acting over the bottom surface of the pallet. Rails located at the pallet periphery restrain the pallet's upward movement and thereby introduce forces opposing those of the hydraulic pallet support system. The force and torque interactions among the areas of load concentration, the interconnected hydraulic pallet support system, the restraining rails, and the pallet structure rigidity, distributes the concentrated load evenly over the bottom of the pallet by hydraulically maintaining an equal supporting force from each of the underlying pallet support ball or roller assemblies.

1 Claim, 8 Drawing Figures

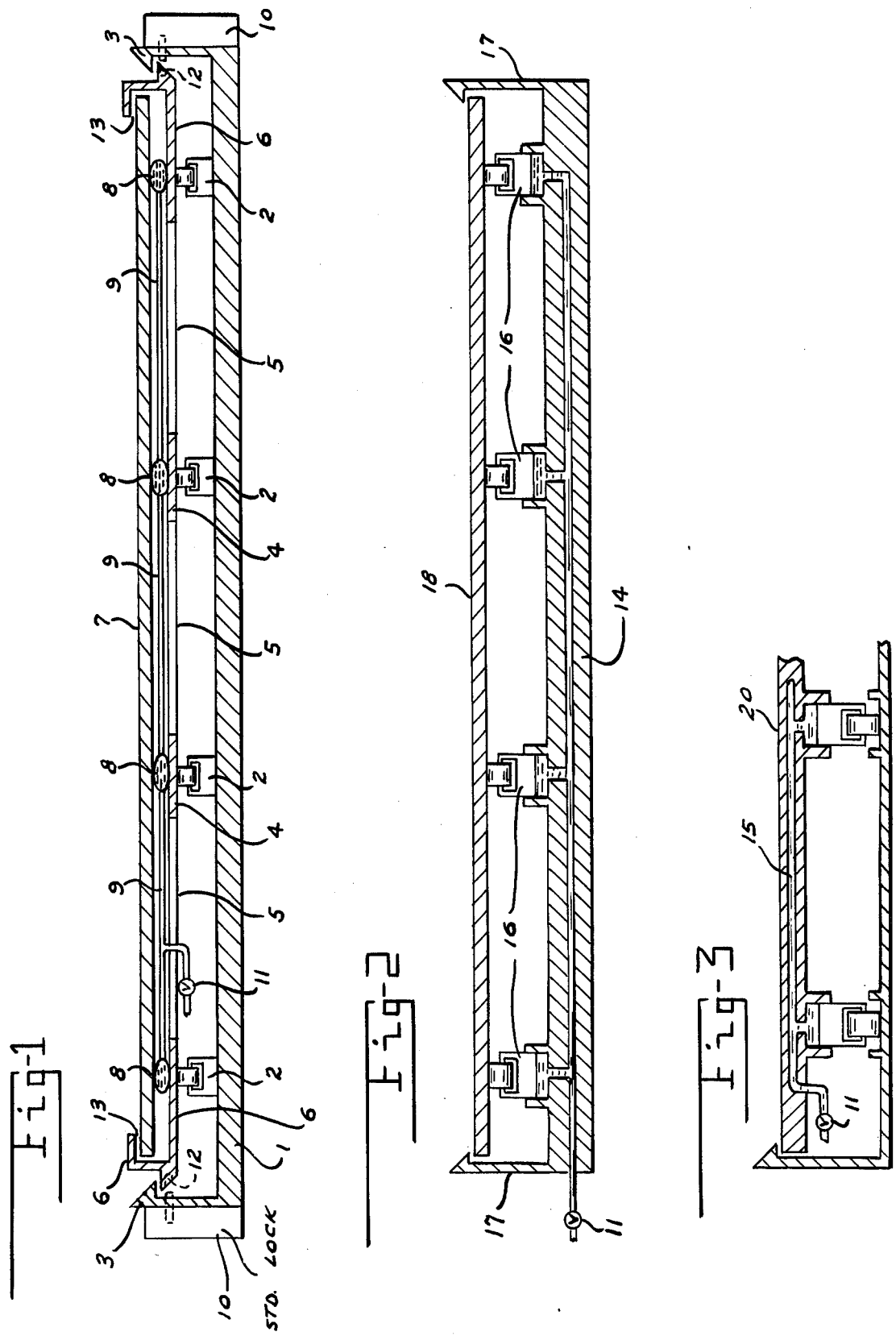

LOAD DISTRIBUTIVE CARGO PLATFORM SYSTEM

RIGHTS OF THE GOVERNMENT

The invention described herein may be manufactured and used by or for the Government of the United States for all governmental purposes without the payment of any royalty.

FIELD OF THE INVENTION

This invention relates to cargo pallets or platforms used to support, transfer or convey loads by a transportation means. More particularly, the invention addresses itself to palletized loads of uneven distribution which are rolled into aircraft on a conveyor type system and restrained from further motion by the engagement of rails located laterally on the aircraft structure.

BACKGROUND OF THE INVENTION

The use of pallets to contain and transfer cargos, the use of resilient materials to cushion pallet shocks, the use of rollers to support and convey such pallets, and the use of rails to restrain pallets in specified locations are all known in the prior art; see U.S. Pat. Nos. 1,770,614; 2,554,657; 3,612,316; and U.S. Air Force Design Handbook DH 1-11 entitled *AIR TRANSPORTABILITY*. What is not known in the art and is specifically disclosed herein is a technique and the apparatus for equalizing the loads on a roller type pallet support system when the pallet contains an unevenly distributed load.

The armed forces and other users of palletized cargo transfer systems frequently encounter hardware performance constraints that limit the types of loads they are able to handle. In the case of aircraft, the usual pallet cargo handling system begins with a semirigid pallet upon which the cargo is restrained. The pallets themselves are loaded into aircraft through the cargo door and located within the aircraft by rolling the pallets on a conveyor type system, generally having multiple exposed balls or rollers. Upward movement of the pallet is limited by the rails attached to the aircraft structure, lateral and longitudinal location is maintained with a standard lock system.

Numerous load, weight and distribution constraint must be considered in selecting a load configuration for the total aircraft, one of the most vexing of which is the load limitations of the individual pallet supporting rollers. For example, a heavy vehicle which otherwise does not exceed the aircraft's lift capacity or center of gravity balance often exceeds the specified weight limitations of the rollers immediately below the wheels, as a result of the concentrated load forces being transmitted through the semirigid pallet. Since the roller static weight limitations take into account vibration and acceleration forces encountered during flight, the actual magnitude of static weight allowed per supporting roller is comparatively small. To compensate for this, complex shoring systems made of lumber are used to spread concentrate load over the pallet surface and thereby onto additional rollers.

BRIEF SUMMARY OF THE INVENTION

According to this invention a cargo pallet, pallet support and restraint system is configured to spread the load over the pallet support system when the load weight is highly concentrated in specific areas over the surface of the pallet. An interconnected hydraulic system equalizes the lifting or supporting forces contributed by each roller. Rails restrain the upward motion of the pallet in such a way as to introduce torsional forces into the pallet structure, in opposition to the concentrated forces of the load. This interconnection of the hydraulic system in combination with the restraining rails both reduces the magnitude of load force bearing upon individual pallet support rollers and distributes the torsional forces over the whole pallet.

Distributing the torsional forces over the whole pallet body has an ancillary benefit not accruing to other schemes of concentrated load spreading. With reductions in local stress, the pallet failure rates due to overload or fatigue failure will be lessened.

In the specific case of the armed forces, such an apparatus would allow the air transport of heavy vehicles, machines or boxes directly on cargo pallets, without extensive lifting and shoring to spread the load over the pallet.

BRIEF DESCRIPTION OF THE DRAWINGS

FIG. 1 is a cross sectional view of the pallet, pallet support and restraint system illustrating an embodiment of the invention.

FIGS. 2 and 3 are cross sectional views of additional embodiments.

DETAILED DESCRIPTION OF THE INVENTION

Figure 4:
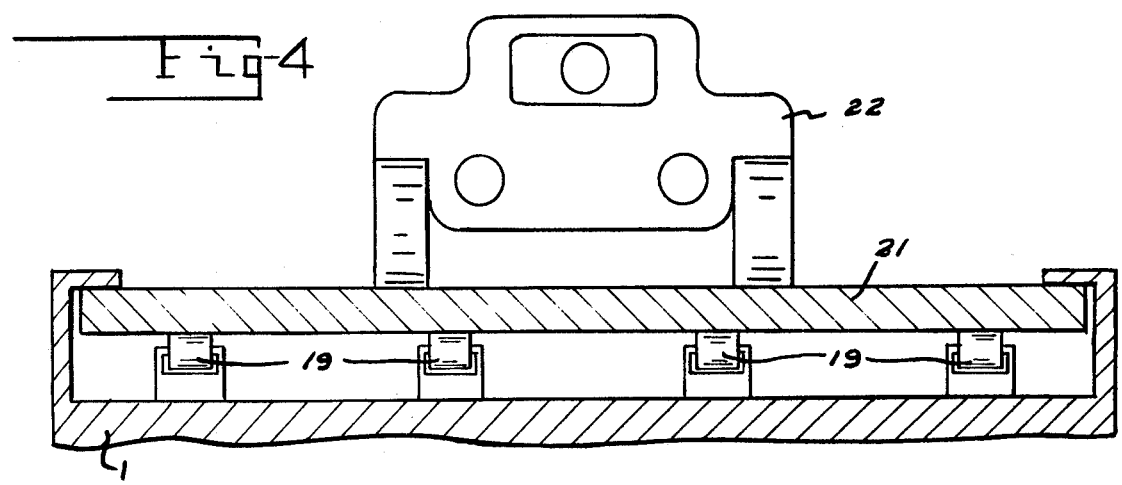
FIG. 4 shows the frontal view of a tank type pallet load which could cause overloading of rollers within the pallet support system.

In one embodiment, the present invention resides in a pallet, pallet support and restraint system, shown by the cross sectional view in FIG. 1, for use in the conveyance of cargo by aircraft. The configuration shown discloses the basic aircraft structure 1, pallet supporting roller assemblies 2, pallet restraint system 3 and 10, and hydraulic system 8, 9 and 11. Riding upon support rollers 2 are inboard skids 4 and outboard skids 6 structurally interconnected by flexible cross members 5. The cargo is attached to pallet 7, which itself floats upon a set of intermediate hydraulic supports 8 which are interconnected by lines 9 and may be connected to a source of hydraulic pressure through valve 11. Standard lock mechanism 10 is attached to aircraft structure 1.

Operation of this system is as follows. Pallet 7, skid system 4, 5 and 6, and hydraulic system 8 and 9 are rolled as a unit over supporting roller assemblies 2 into the appropriate aircraft location. Rails 3 limit the upward movement of the pallet. Lateral and longitudinal motion is prevented by engagement of standard lock mechanism 10 at contact points 12. The hydraulic system is then fully pressurized to raise pallet 7 until the lateral faces of pallet 7 contact skids 6 at areas 13. Pressurization of the interconnected hydraulic system through valve 11 thereby introduces lifting and torsional forces into pallet 7 in opposition to local concentrations of cargo weight.

FIGS. 2 and 3 show two alternate embodiments of the invention. In FIG. 2 the hydraulic system is incorporated into aircraft structure 14 and individual rollers 16 are supported directly by the hydraulic system. With this configuration laterally located rails 17 engage pallet 18 by pressurizing the hydraulic system through valve 11.

The embodiment of FIG. 3 shows a pallet, pallet support and restraint system similar to that in FIG. 2, except that hydraulic system 15 is now incorporated into the body of pallet 20. Action of the rails system proceeds as described for FIG. 2.

Figure 5:
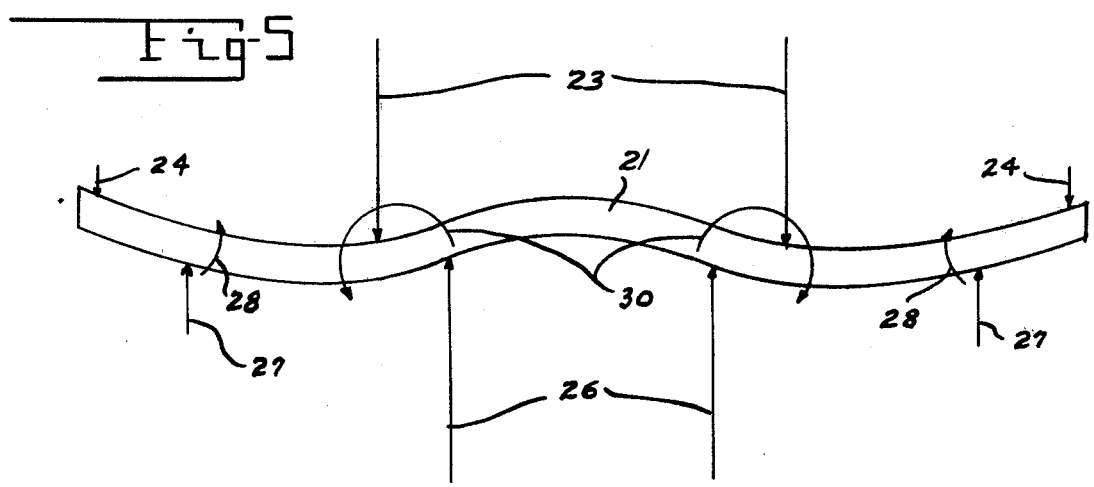
FIG. 5 shows the forces on a pallet with present systems, exaggerating for purposes of illustrating the flexure that would occur with the load of FIG. 4.

The operational mechanics of this invention are best illustrated by analysis of some typical examples. First, consider a simple two dimensional case where the aircraft has a fixed multiroller pallet support system of the type generally in present use. Aircraft structure 1, which supports fixed rollers 19, is comparatively rigid, pallet 21 is semirigid, and load 22 is a tank as illustrated in FIG. 4. FIG. 5 shows the directions and relative magnitudes of the dominant vehicle induced torques and forces, and the corresponding exaggerated flexure of the pallet. Downward forces 23 of the tank and 24 of the rails are balanced by upward forces 26 and 27 of the pallet support rollers. Torsional forces 28 have a negligible effect upon the pallet. Setting aside for the moment the large torsional stresses 30 imposed upon the pallet body itself, FIG. 5 displays vividly the disproportionate loads 26 borne by the two center sets of supporting roller assemblies. As indicated earlier, these magnitudes of load typically exceed the practical capability of presently available pallet support roller assemblies.

Figure 6:
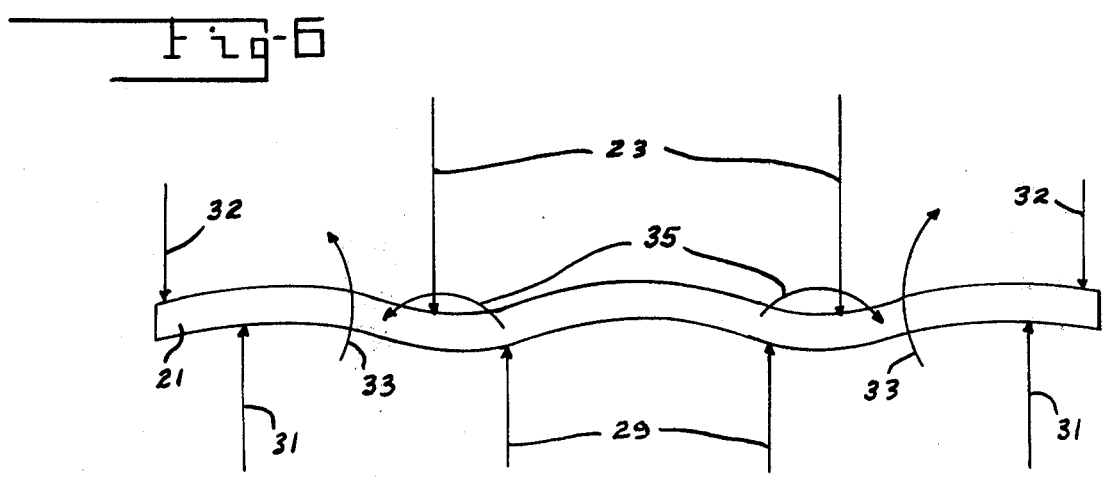
FIG. 6 displays the forces and exaggerated flexure of the pallet, using the system disclosed herein and the load of FIG. 4.

On the other hand, if tank load 22 of FIG. 4 is placed upon the pallet, pallet support and restraint system of the type shown in FIG. 2, the forces and torques acting upon the pallet are shown in FIG. 6. Since the pallet support roller assemblies are hydraulically interconnected, upward forces 29 and 31 are equal and their interaction increases the magnitude of rail forces 32. Torsional forces 35 have decreased while opposing torsional forces 33 have increased, effectively reducing peak torsional stresses in the pallet. As is evident from FIG. 6, use of apparatus similar to that shown in FIG. 2 both reduces peak loads on individual rollers in the pallet support system and distributes the torsional stresses in the pallet over the full body of the pallet.

Figure 7:
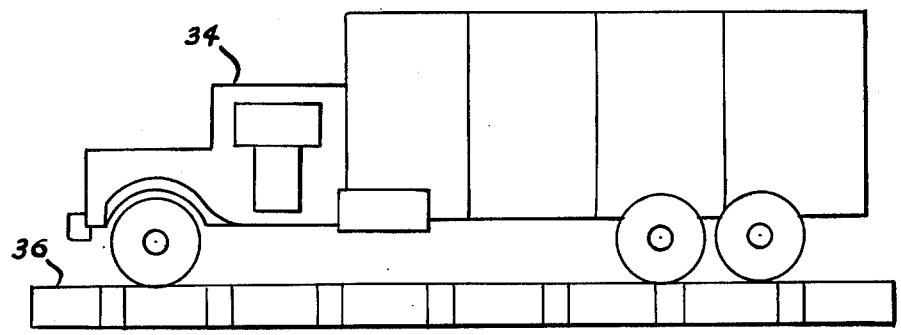
FIG. 7 shows another type of vehicle load, but in an axis perpendicular to that of FIG. 4.

FIG. 7, as the second example, shows a more complex load, requiring the analysis to consider the effects of another dimension. The load imposed upon pallet 36 by laden truck 34 varies not only in the truck width dimension, but also over the length of the truck. Again, individual roller when used with a rigid type pallet supporting system are not capable of withstanding the concentrated loads directly below the wheels of the truck.

Figure 8:
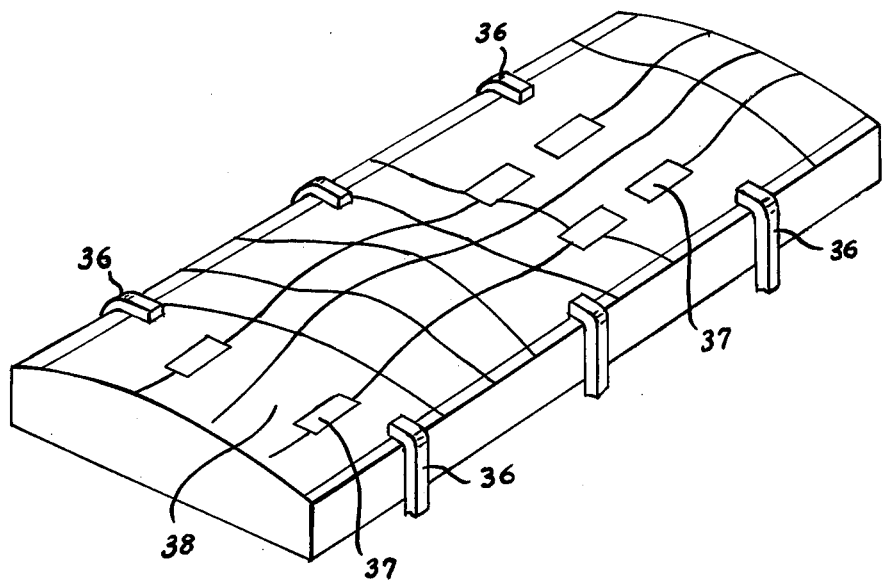
FIG. 8 is a three dimensional exaggerated diagrammatic contour of the flexure using the system disclosed herein and the vehicle load of FIG. 7.

On the other hand, if the hydraulically balanced system of the type shown in FIG. 2 is used, not only are all the rollers supporting identical loads, but the stresses in the pallet are more evenly distributed. FIG. 8 shows a flexure contour of the pallet, exaggerated for purposes of illustration, when supporting the load of FIG. 7. Symbolically shown are the action of the rails 36, the areas where the truck's tires contact the pallet 37, and the flexure contour 38 of the pallet when the underlying pallet support system is hydraulically interconnected.

While the invention has been shown and described with reference to particular embodiments thereof, it will be understood by those skilled in the art that various changes in form and materials may be made without departing from the spirit and scope of the invention.

I claim:

1. An integrated pallet and support system to be used in conjunction with a standard cargo aircraft roller, rail and lock system, comprising:
    a. multiple parallel longitudinal skids upon which the system slides over aircraft mounted rollers, wherein the side skids both extend outward sufficiently to mate with the aircraft rails and lock systems and, also, extend upward and inward to enclose the outer edge of the pallet to limit the magnitude of its upward travel;
    b. multiple flexible cross members interconnecting the skids;
    c. multiple hydraulic lifting means situated upon the skids and hydraulically connected in parallel;
    d. a cargo pallet which is sufficiently rigid to translate localized load stresses throughout the whole pallet while floating upon the multiple hydraulic lifting means and confined at its outer edges by the side skids; and
    e. a hydraulic valve connected to the interconnected hydraulic means and to a source of hydraulic pressure.

* * * * *